United States Patent [19]

Bray et al.

[11] Patent Number: 4,577,811
[45] Date of Patent: Mar. 25, 1986

[54] TAPE REEL POSITION SENSOR

[75] Inventors: Stuart W. Bray; Timothy C. Hughes; Susan E. Ariniello, all of Boulder County, Colo.

[73] Assignee: Storage Technology Corporation, Louisville, Colo.

[21] Appl. No.: 706,553

[22] Filed: Feb. 28, 1985

[51] Int. Cl.$^4$ .......................... G03B 1/04; G11B 15/32
[52] U.S. Cl. ..................................... 242/195; 226/91; 242/71.8
[58] Field of Search .......................... 242/195, 197–199, 242/206–210, 71.8; 226/91, 11, 92; 250/557, 571; 352/235; 360/71, 93, 137

[56] References Cited

U.S. PATENT DOCUMENTS

| | | | |
|---|---|---|---|
| 3,744,736 | 7/1973 | Kruhn | 242/195 |
| 3,758,009 | 9/1973 | Magahiro et al. | 226/11 |
| 3,792,491 | 2/1974 | Inaga | 360/71 |
| 3,797,776 | 3/1974 | Umeda et al. | 242/188 |
| 3,912,205 | 10/1975 | Koyama | 242/188 |
| 4,243,186 | 1/1981 | Peter et al. | 242/195 |
| 4,334,656 | 6/1982 | Crawford et al. | 242/195 |
| 4,399,936 | 8/1983 | Rueger | 226/92 |
| 4,426,047 | 1/1984 | Richard et al. | 242/197 |

Primary Examiner—Leonard D. Christian
Attorney, Agent, or Firm—James R. Young

[57] ABSTRACT

Apparatus and methods are disclosed for properly positioning the machine reel in a magnetic tape drive containing an automatic tape threading mechanism, wherein the file reel consists of a tape cartridge with tape attached to a leader block. The automatic threading mechanism connects to the leader block and pulls the tape through the tape path to insert the leader block into the hub of the machine reel. However, before the leader block can be inserted into the machine reel hub, the machine reel must be properly aligned to receive the leader block. The present invention provides apparatus and methods for properly aligning the machine reel to receive the tape leader block. The disclosure also provides a means to detect when the last wrap of tape is being removed from the machine reel hub during an unload operation and stop the machine reel at the proper angular location so that the tape leader block can be removed from the hub without damage to the hub or the leader block.

13 Claims, 8 Drawing Figures

TAPE REEL POSITION SENSOR

BACKGROUND OF THE INVENTION

This invention relates to tape transports and more particularly to digital magnetic tape transports having an automatic tape load feature which incorporates a leader block attached to the end of the tape being threaded.

Systems which transfer a web member, such as magnetic recording tape, between a file reel and a machine reel often have an automatic loading path. The operator merely inserts a file reel containing tape, and pushes an automatic load button. Carefully located tape guides, which frequently include air jets, guide the tape along the loading path until the tape attaches to and begins winding on the machine reel. Sensors located along the tape path, which frequently include the beginning of tape and end of tape sensors, generate a load error signal if the tape does not load properly. In most existing systems, the end of the tape being threaded is shaped to have rounded corners, and is passed through the threading channel of the tape using air jets. As the end of tape approaches the machine reel, air jets force it between the flanges of the machine reel, and the tape is attached to the machine reel hub by a vacuum system through holes contained in the hub.

In another type of existing system, for example that described in U.S. Pat. No. 4,334,656, to Crawford et al., entitled "Automatic Tape Threading Apparatus For Magnetic Tape Transports", the file reel consists of a cartridge with a leader block that is attached to the end of the tape to be threaded. When the cartridge is inserted in this type of system, a coupling device connects to the leader block and pulls the leader block and tape through the tape path and inserts the leader block into the hub area of the machine reel. In this type of automatic tape threading apparatus, it is important that the slot in the hub of the machine reel be aligned properly with the path taken by the coupler in inserting the leader block into the reel hub. The alignment of this slot with the thread path is even more important during the unload process as the last wrap of tape is being unwound off the machine reel, the machine reel must stop at the exact position aligning the slot to the thread path so that the leader block can be removed from the machine reel without damage to the leader block and without breaking the tape.

There is need in the art then for apparatus to align the machine reel with the tape thread path both during initial threading of the tape into the machine reel and for aligning the machine reel as the last wrap of tape comes off the machine reel just prior to the unload threading operation.

SUMMARY OF THE INVENTION

It is an object of the present invention to provide an apparatus and method for aligning the machine reel to an autothread tape path in a magnetic tape transport system wherein a leader block is attached to the tape being loaded or unloaded.

It is a further object of the present invention to provide an apparatus and method that correctly aligns the machine reel as the last wrap of tape is unwound from such machine tool. Proper alignment allows the tape leader block to be removed from the machine reel in the proper autothread path without damage to either the machine reel, the tape leader block, or the tape.

The preceding and other objects of the present invention are realized through the use of an optical alignment system including a light source for directing light toward the machine reel, light detection means for detecting light reflected from the machine reel, reflective means attached to the hub of the machine reel and attached so that light from the light source will reflect off the reflective surface and impinge on the light detection means only when the machine reel is located at a particular angular location. The apparatus also includes a controller to drive a machine reel rotating means to rotate the machine reel until light is detected by the light detection means. The reflective means is placed on the hub of the machine reel such that tape wound on the hub blocks reflected light. If the machine reel is empty, light from the light source is reflected off the reflective means and the machine reel is rotated until this reflected light is detected by the light detection means thereby aligning the machine reel at the correct position. Once the leader block is inserted into the machine reel by the autothread mechanism, the machine reel begins to turn wrapping tape over the reflective area and blocking light from the light source to the reflective means, therefore, the controller means is prevented from driving the reel to a particular angular location while tape is loaded on the hub. During an unload operation the tape is turned in an unwinding direction until the last wrap of tape is removed from the hub. This exposes the reflective means, and allows light from the light source to reflect off the reflective means and be detected by the light detector. As the last wrap is removed from the hub and light is detected by the light detection means, the controller stops the machine reel thereby correctly aligning the machine reel for removal of the leader block.

The invention also includes a method for aligning the machine reel in a magnetic tape device having an automatic tape threading mechanism that uses a leader block, including the steps of mounting a reflective means to a hub of the machine reel such that tape wound on the hub will block light from reaching the reflective means, directing light toward the reflective means, detecting light received from the reflective means, and rotating the machine reel until the light is detected. In this manner an empty machine reel can be positioned correctly to receive a tape leader block into a slot in the machine reel. Since tape wound on the hub will block light to the reflective means, the machine reel will not be positioned by the controller while tape is present on the hub. As tape is removed from the hub during an unload operation, the reflective means will be exposed as the last wrap of the tape is removed from the hub. Once the reflective means is exposed, light from the light source will reflect from the reflective means and be detected by the light detection means, whereupon the controller will stop the rotation of the machine reel at the correct angular location to allow the tape leader block to be removed from the slot in the machine reel.

DETAILED DESCRIPTION OF THE INVENTION

The following is a description of the best presently contemplated mode of carrying out the present invention. This description is given only to illustrate the general principles of the invention and is not to be taken in a limiting sense. The true scope of the invention can be ascertained by reading the appended claims.

Figure 1:
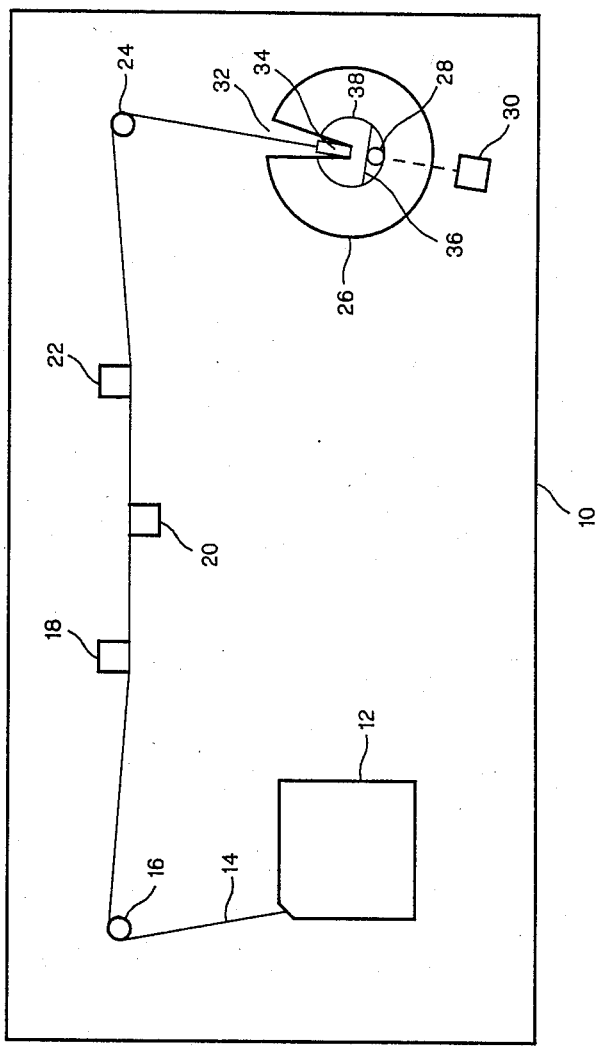
FIG. 1 is a plan view which illustrates a reel-to-reel type magnetic tape transport with which the present invention may be employed.

FIG. 1 is a plan view which illustrates a reel-to-reel type magnetic tape transport with which the present invention may be employed. A magnetic tape device 10 contains a removable file reel cartridge 12. The thread process includes extracting the leader block 34, with tape 14 attached, from the edge of the cartridge 12, threading the tape around the guide post 16, along one side of the guide block 18, over the magnetic read/write head 20, along the guide block 22, around the guide post 24, and into the slot 32 of the machine reel 26. A light source 28 is shown underneath the machine reel 26 shining into the hub 38 of the machine reel 26 with light reflecting from the reflective surface 36 and being directed toward the light detector 30. With the machine reel 26 in the position shown, light from the light source 28 will be received by the light detector 30 and the controller circuit (not shown) will leave the reel 26 in this position. The machine reel 26 will also be positioned as shown in FIG. 1 for the unload operation which includes rewinding the tape into the cartridge 12 while directing the leader block 34 in the reverse direction along the tape path used for threading tape.

Figure 2:
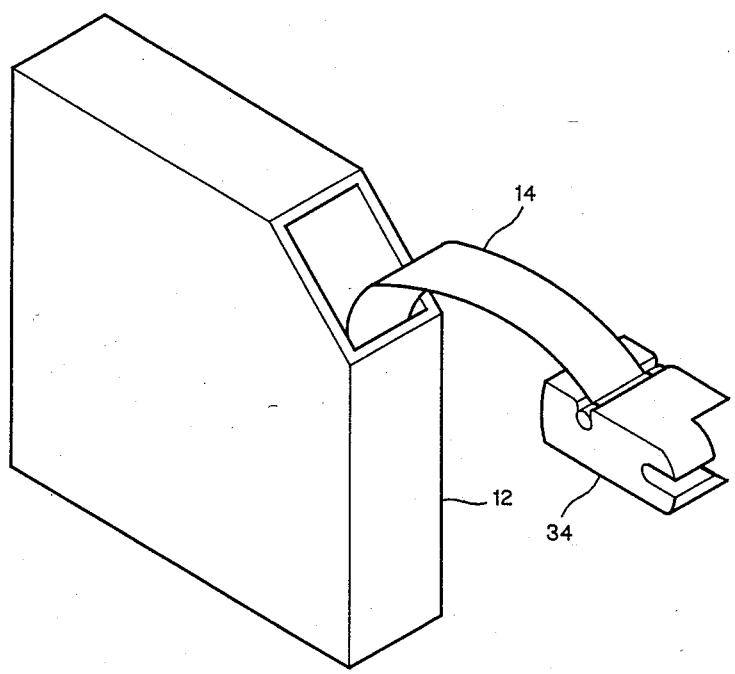
FIG. 2 illustrates a tape cartridge showing tape extended from the cartridge and a leader block attached to the tape.

FIG. 2 is a more detailed drawing of the tape cartridge 12 showing tape 14 extended from the cartridge and further showing tape 14 connected to the leader block 34.

Figure 3:
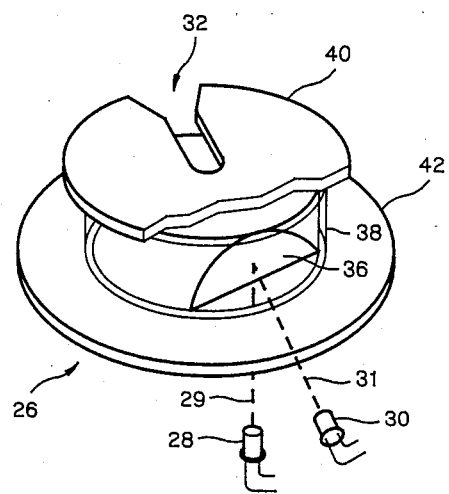
FIG. 3 is a perspective view of the machine reel of a tape transport showing the light source, reflector, and light detector of the present invention.

FIG. 3 is a perspective view of the machine reel of a tape transport showing the light source, reflector, and light detector of the present invention. Light from the light source 28 follows a path shown by the dashed line 29 through the bottom flange 42 of the machine reel 26. This light reflects from the reflective surface 36 and follows a path shown by the dashed line 31 between the upper flange 40 and the lower flange 42 of the machine reel 26 to impinge on the light detector 30.

Figure 4:
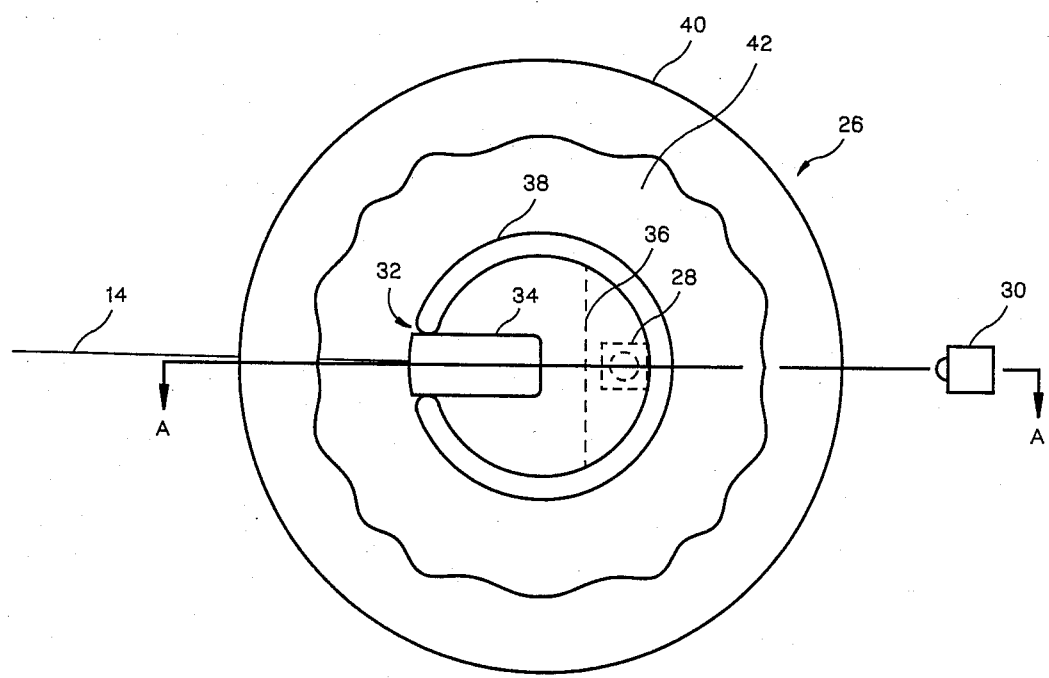
FIG. 4 is a top view of the machine reel.

FIG. 4 is a top view of the machine reel 26. The illustration is shown at the point where a tape load operation has just been completed wherein tape 14 is attached to the leader block 34 which has been inserted into the slot 32. As the machine reel 26 turns, the tape 14 will wrap around the machine reel hub 38. A light source 28, shown in dashed lines, is located underneath the machine reel 26 and light from this source shines upward into the base of the hub 38 to reflect off a reflective surface 36 and shine out between the upper flange 40, shown cut away, and the lower flange 42 to impinge on the light detector 30. The reflective surface 36 is a flat surface angled approximately 45 degrees from the plane of the flange 42, therefore, light from the light source 28 will only reflect off the surface 36 into the detector 30 when the machine reel 26 is located at the angular position shown. As the reel 26 turns in either direction, light will be directed to one side of the detector 30.

Figure 5:
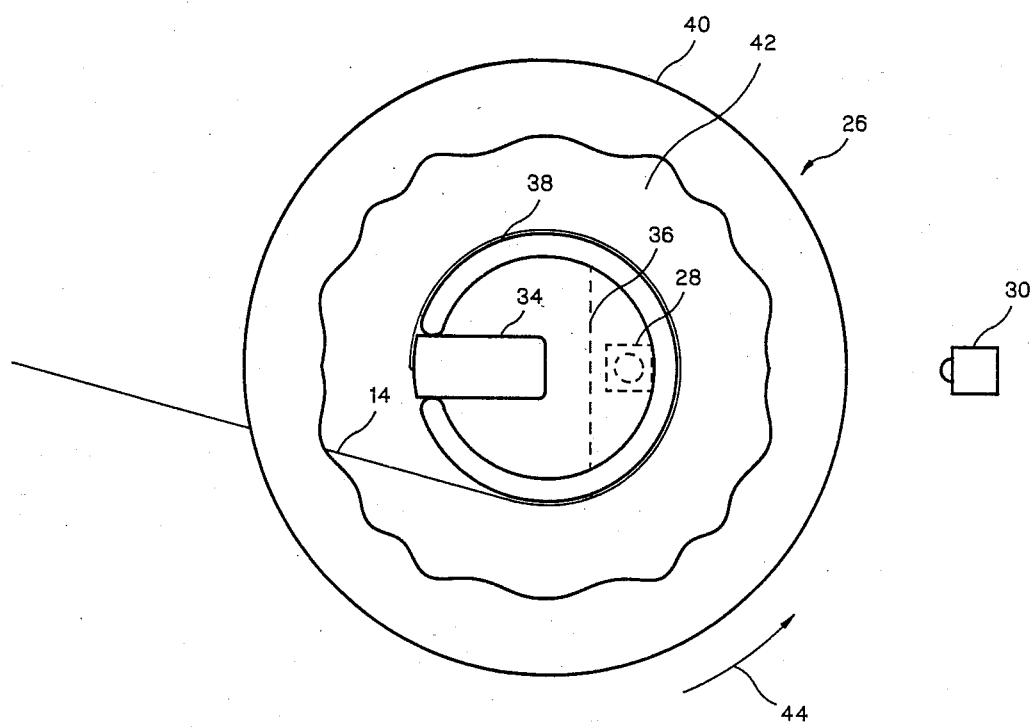
FIG. 5 is a top view of the machine reel showing one wrap of tape on the hub.

FIG. 5 illustrates the machine reel 26 after the reel has made one revolution in the direction of arrow 44. Since the machine reel 26 has rotated to the same angular position as shown in FIG. 4 light from the light source 28 could reflect off the reflective surface 36 and impinge on the light detector 30, however, tape 14 now blocks the light path as the light attempts to pass through the hub 38 between the upper flange 40, shown cut away, and the lower flange 42. Therefore, the light is blocked so that light detector 30 will have no output and the controller will not stop the rotation of the machine reel 26.

Figure 6:
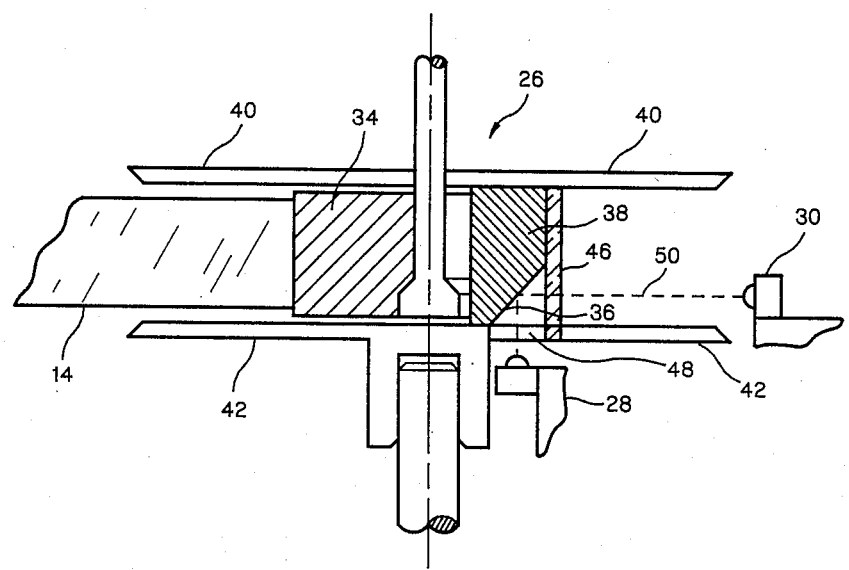
FIG. 6 is a cross sectional view of the machine reel taken through lines A—A of FIG. 4.

FIG. 6 shows a cross sectional view of the machine reel 26 taken through the lines A—A of FIG. 4. Tape 14 is attached to the leader block 34 which is inserted into the machine reel 26. Light from the light source 28 shines along the dotted line 50 through a transparent window 48 in the lower flange 42. The light reflects from a reflective surface 36, formed in the hub 38 at an angle of approximately 45 degrees from the plane of the lower flange 42. The light continues along the dotted line 50 through a transparent window 46 in the hub 38 to shine on the light detector 30. Those skilled in the art will recognize that the position of the light source and light detector could be interchanged without affecting the function of the invention. Placing the light source at 30 would allow more space for multiple light emitter elements, should multiple light emitter elements be necessary to obtain sufficient light, and would eliminate the lighthouse effect preventing erroneous detection by other light detectors nearby.

Figure 7:
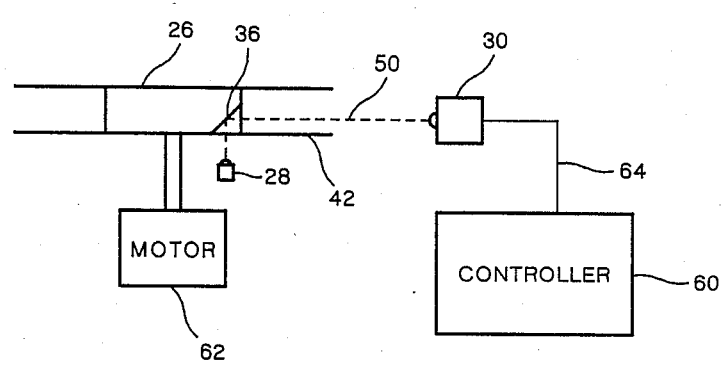
FIG. 7 is a block diagram showing the controller and machine reel motor.

FIG. 7 is a block diagram showing the controller and machine reel motor. Light from light source 28 shines through the lower flange 42 of the machine reel 26 to reflect off the reflective surface 36 and shine on the light detector 30. The light detector 30 converts the light into a signal 64 which is input to a controller 60. The controller 60 controls a motor 62 to rotate the reel 26 until light is detected by the light detector 30 whereupon the controller 60 stops the motor 62 and the reel 26.

Figure 8:
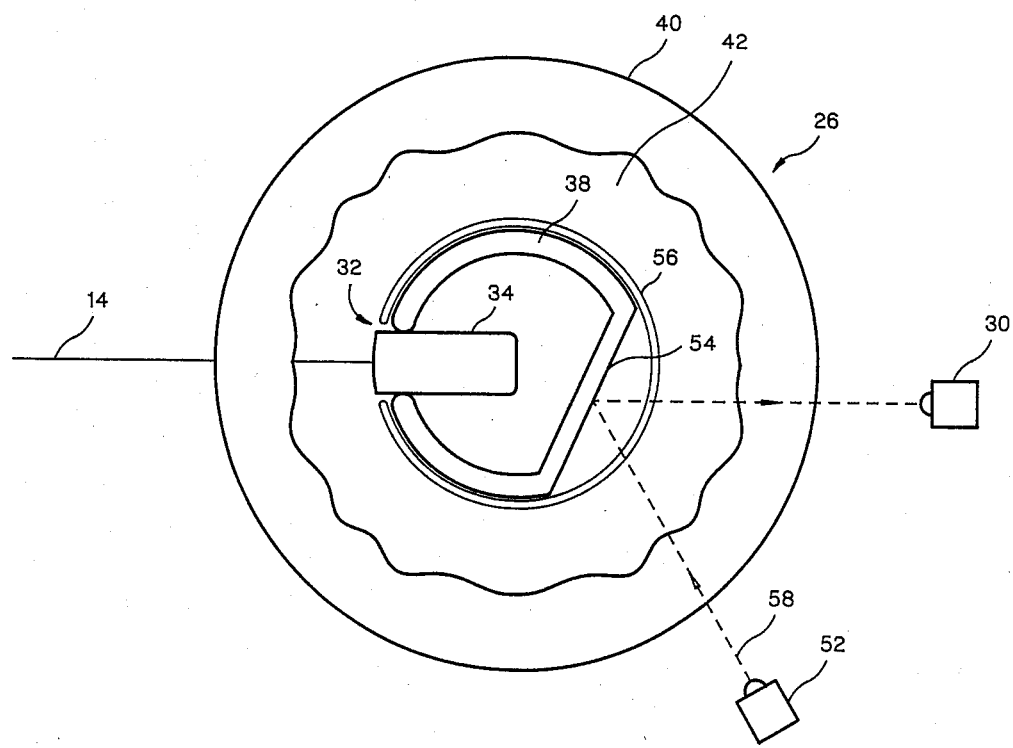
FIG. 8 is a top view of the machine reel of a tape transport showing an alternative embodiment of the present invention.

FIG. 8 illustrates an alternative embodiment of the present invention. Tape 14 is attached to the leader block 34 which is inserted into the slot 32 and the machine reel hub 38. Light from a light source 52 travels in the direction of arrow 58 and reflects off a reflective surface 54 to shine on the light detector 30. The reflective surface 54 is formed as a flattened portion of the hub 38 at the correct angle such that light from the light source 52 will impinge on the light detector 30 only when the machine reel 26 is at the angular location shown. To maintain the hub 38 in the form of a circle, so that the tape 14 will wrap properly around the hub 38, a circular transparent outerlayer 56 is place over the hub 38. Since this layer 56 is transparent light from the light source 52 can shine through it to reflect off the surface 54 and back to the light detector 30. After one revolution, the tape 14 will be wrapped over top of the layer 56 to block light from the reflective surface 54 and prevent a controller from stopping the reel while tape is wrapped around the hub 38. Those skilled in the art will recognize that the invention disclosed herein can readily be implemented using commercially available components.

While the invention herein disclosed has been described by means of a specific embodiment and application thereof, numerous modifications and variations could be made thereto by those skilled in the art without departing from the spirit and scope of the present invention. It is therefore to be understood that within the scope of the appended claims, the invention may be practiced otherwise than as specifically described herein.

We claim:

1. In a machine having a spool for winding webbing theron wherein said webbing is wound over a hub of said spool and further wherein said spool must be positioned at a fixed angular location for insertion of an end of said webbing into said hub, apparatus for positioning said spool for proper insertion of said end of said webbing, comprising:
    means for rotating said spool;
    a light source for directing light toward said spool;
    light detection means for detecting light reflected from said spool;
    reflective means attached at an angle to said hub of said spool for reflecting light from said light source to said light detection means when said spool is located at a fixed angular location and further attached such that webbing wound on said hub will prevent light from reaching said reflective means; and
    controller means attached to said light detection means and said rotating means for rotating said spool until light is detected by said light detection means;
    whereby said light will only be detected if said spool contains no webbing and said spool is rotated into a correct angular location for insertion of said webbing into said hub.

2. The apparatus of claim 1 wherein said reflective means comprises:
    a reflective flat area formed inside said hub and formed at an acute angle to the plane of rotation of said spool;
    a first transparent opening formed in one flange of said spool adjacent said reflective surface to allow light to pass from said light source to said reflective surface; and
    a second transparent opening formed in a surface of said hub to allow light reflected from said flat surface to pass therethrough.

3. The apparatus of claim 2 wherein said light source is mounted substantially perpendicular to the plane of rotation of said spool and said light detection means is mounted in the plane of rotation of said spool whereby light from said light source is directed through said first window to reflect from said flat area, and pass through said second window to impinge on said light detection means.

4. The apparatus of claim 2 wherein said light source is mounted in the plane of rotation of said spool and said light detection means is mounted substantially perpendicular to the plane of rotation of said spool whereby light from said light source is directed through said second window to reflect from said flat area, and pass through said first window to impinge on said light detection means.

5. In a magnetic tape device having an automatic tape threading mechanism using a tape leader block, apparatus for positioning a machine reel of said device for proper insertion and removal of said leader block into a slot in a hub of said machine reel, comprising;
    rotating means for rotating said machine reel in winding and unwinding directions;
    reflective means attached to said hub of said machine reel and being positioned such that tape wound on said machine reel will block light from reaching said reflective means;
    a light source mounted adjacent said machine reel for directing light at said reflective means;
    light detection means for receiving light from said reflective means; and
    controller means attached to said light detection means and said rotating means for rotating said machine reel until light is detected by said light detection means;
    whereby said machine reel is rotated in an unwinding direction until said reflective surface is uncovered and said reel is further rotated until light from said light source is detected by said light detection means whereupon said machine reel rotation is stopped thereby positioning said machine reel in a proper position to remove or insert said leader block.

6. The apparatus of claim 5 wherein said reflective means comprises:
    a flat area formed inside said hub of said machine reel and formed at an acute angle to the plane of rotation of said hub;
    reflective material attached to said flat area;
    a first opening formed in one flange of said machine reel to allow light to pass therethrough; and
    a second transparent window formed in the surface of said hub to allow light reflected from said flat area to pass therethrough.

7. The apparatus of claim 6 wherein said light source is mounted substantially perpendicular to the plane of rotation of said machine reel and said light detection means is mounted in the plane of rotation of said machine reel whereby light from said light source is directed through said first window to reflect from said flat area, and pass through said second window to impinge on said light detection means.

8. The apparatus of claim 6 wherein said light source is mounted in the plane of rotation of said machine reel and said light detection means is mounted substantially perpendicular to the plane of rotation of said machine reel whereby light from said light source is directed through said second window to reflect from said flat area, and pass through said first window to impinge on said light detection means.

9. The apparatus of claim 5 wherein said reflective means comprises:
    a flat area formed on the circumference of said hub of said machine reel;
    reflective material attached to said flat area; and
    a transparent circular ring mounted over said hub.

10. The apparatus of claim 9 wherein said light source is mounted in the plane of rotation of said machine reel and said light detection means is also mounted in the plane of rotation of said machine reel.

11. In a magnetic tape device having an automatic tape threading mechanism using a tape leader block, a method for aligning a machine reel of said device for proper insertion and removal of said leader block into a slot in a hub of said machine reel, comprising the steps of:
- (a) mounting a reflective means to said hub of said machine reel whereby tape wound on said hub will block light from reaching said reflective means;
- (b) directing light toward said reflective means;
- (c) detecting light received from said reflective means; and
- (d) rotating said machine reel until light from said reflective means is detected.

12. The method of claim 11 wherein step (a) further comprises the steps of:
- (a)(1) forming said reflective means as a flat surface;
- (a)(2) mounting said reflective means inside said hub at an acute angle to the plane of rotation of said machine reel;
- (c)(3) forming a first window in a flange of said hub and aligning said first window with said reflective surface; and
- (d)(4) forming a second window in a flange of said machine reel and aligning said second window with said reflective means.

13. The method of claim 12 wherein step (b) further comprises directing said light at an angle substantially perpendicular to the plane of rotation of said machine reel.

* * * * *